(12) United States Patent
Yuyama et al.

(10) Patent No.: US 8,267,530 B2
(45) Date of Patent: Sep. 18, 2012

(54) VIDEO PROJECTOR

(75) Inventors: Keiji Yuyama, Himeji (JP); Taichi Yoshimura, Osaka (JP); Yasuyuki Hirouchi, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 309 days.

(21) Appl. No.: 12/630,352

(22) Filed: Dec. 3, 2009

(65) Prior Publication Data

US 2010/0141853 A1     Jun. 10, 2010

(30) Foreign Application Priority Data

Dec. 4, 2008 (JP) ................. 2008-309753

(51) Int. Cl.
*H04N 5/64* (2006.01)
*G03B 21/14* (2006.01)
(52) U.S. Cl. .............. 353/119; 353/122; 348/789
(58) Field of Classification Search .......... 353/119, 353/122; 348/744, 789; 70/20, 64, 207, 70/443; 248/551
See application file for complete search history.

(56) References Cited

U.S. PATENT DOCUMENTS

| 2,481,106 | A | 9/1949 | Gold |
| 3,192,004 | A | 6/1965 | Whitney |
| 2003/0081185 | A1* | 5/2003 | Nakano et al. ............. 353/97 |
| 2004/0239897 | A1 | 12/2004 | Ogawa et al. |
| 2008/0013056 | A1 | 1/2008 | Tsuboi |
| 2010/0157175 | A1* | 6/2010 | Suzuki et al. ............. 348/789 |

FOREIGN PATENT DOCUMENTS

| DE | 2550454 | 5/1977 |
| EP | 2007225831 | 9/2007 |
| JP | 2007225831 | 9/2007 |
| JP | 2008-020551 | 1/2008 |

OTHER PUBLICATIONS

Sanyo Electric Co., Think GAIA, Product brochure for LP-XC55 and LP-XC50, Jun. 2008.
Extended European Search Report from a corresponding case, dated Jan. 25, 2010.

* cited by examiner

*Primary Examiner* — Kevin Pyo
(74) *Attorney, Agent, or Firm* — Novak Druce + Quigg, LLP

(57) ABSTRACT

A video projector including a housing which accommodates a component for projecting and displaying a picture. A cable insertion member is fastenable to an antitheft cable. The cable insertion member is retractable into the housing.

11 Claims, 7 Drawing Sheets

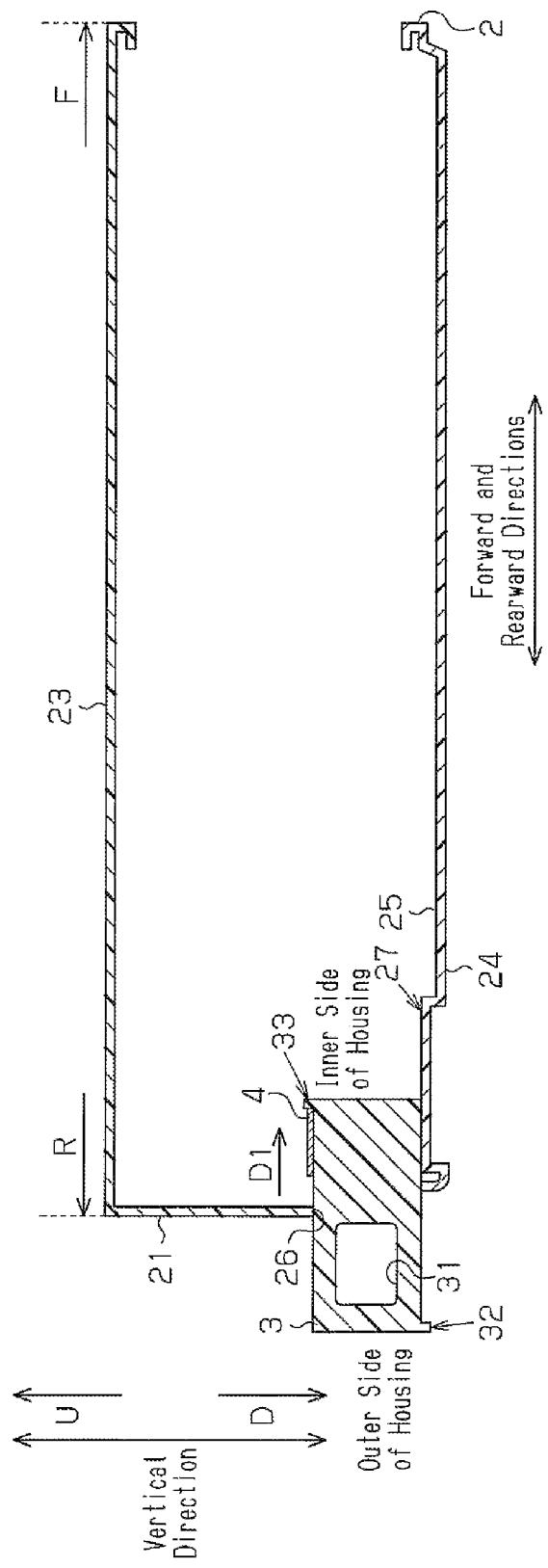

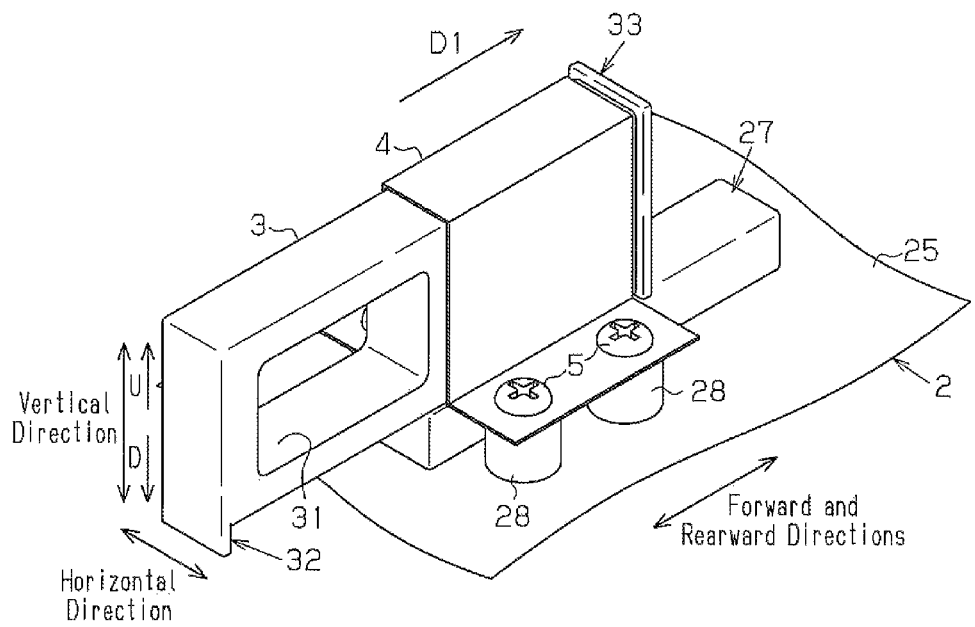
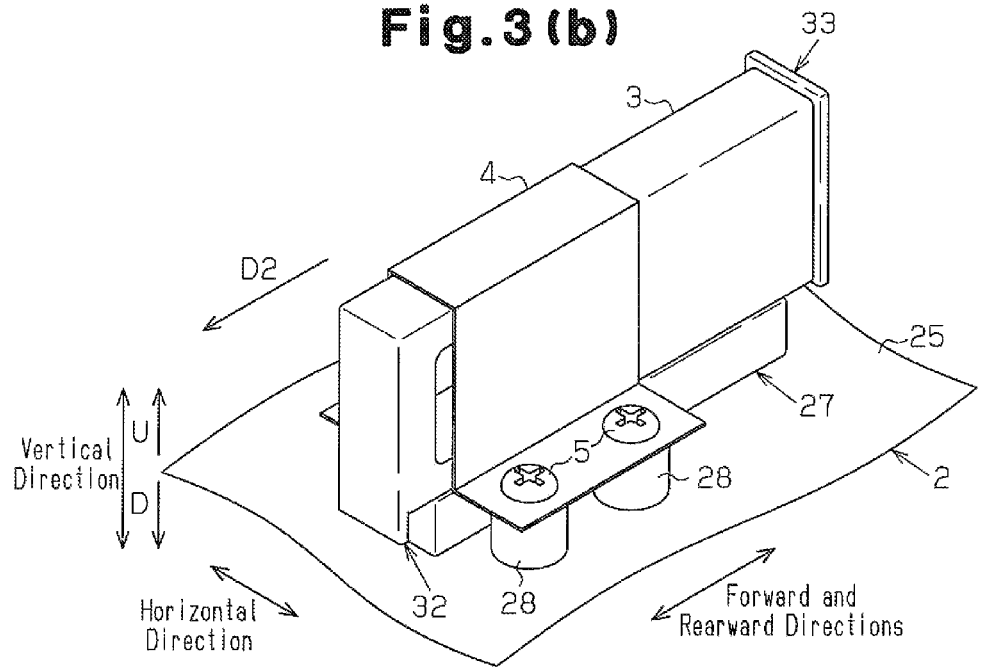

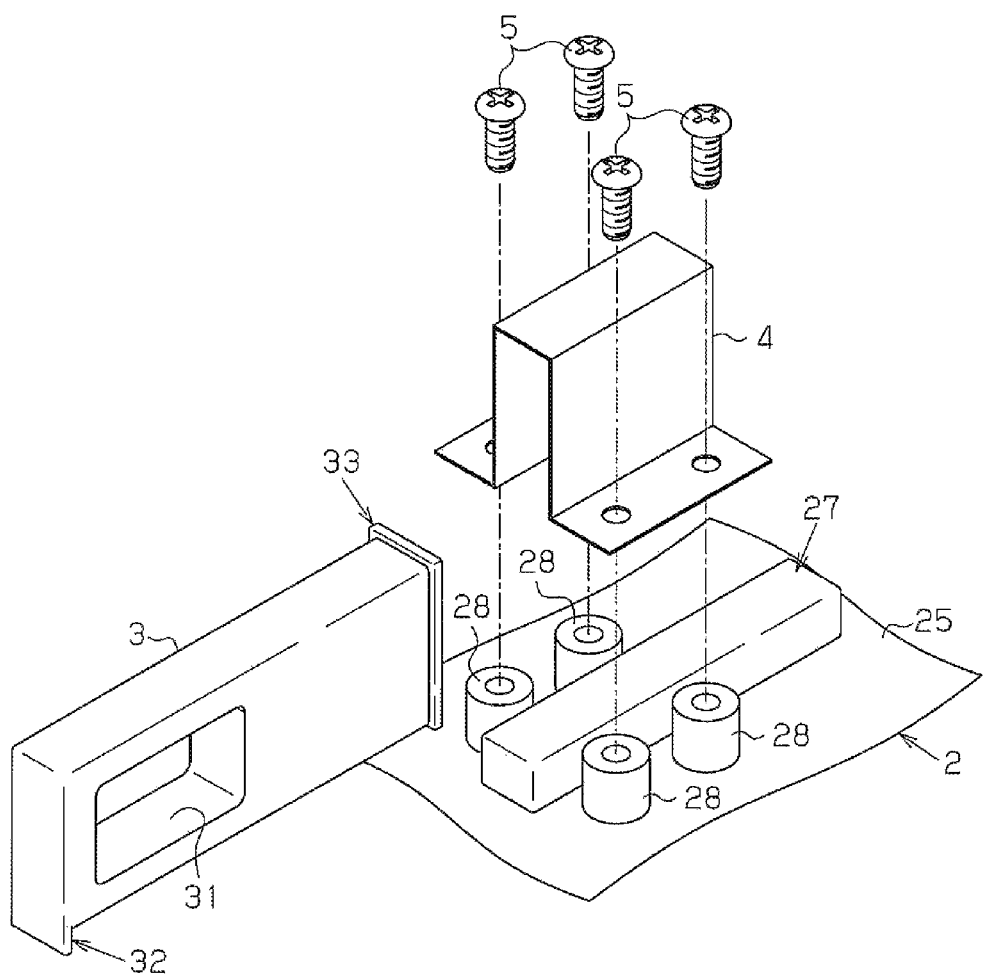

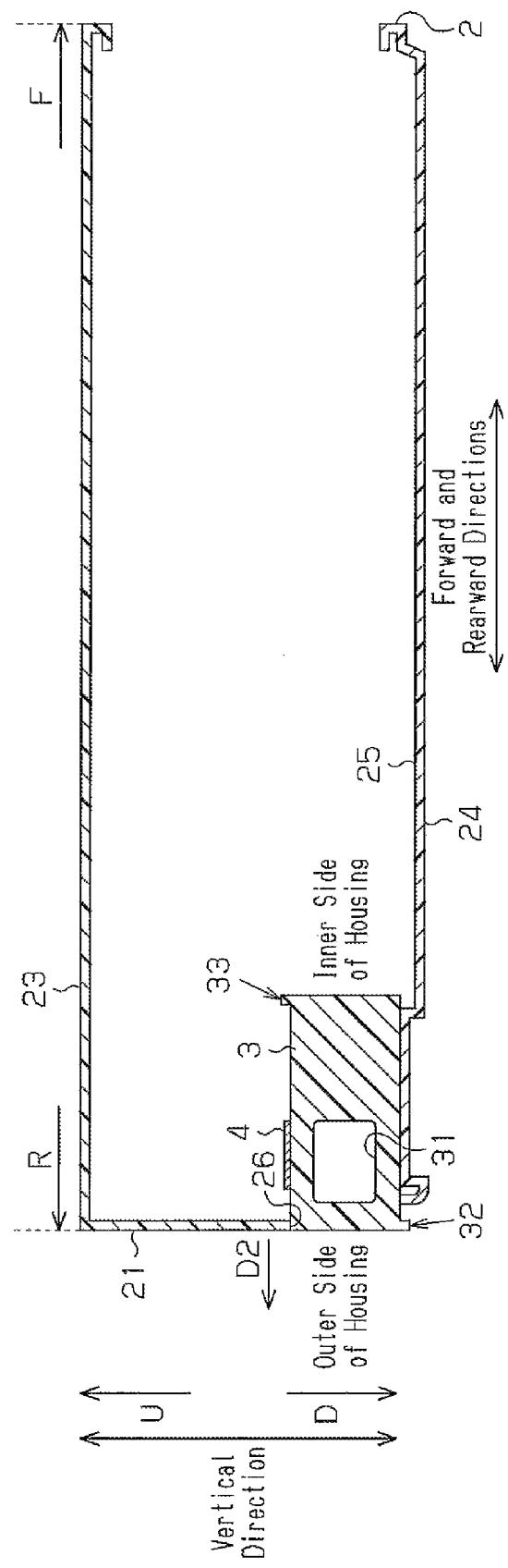

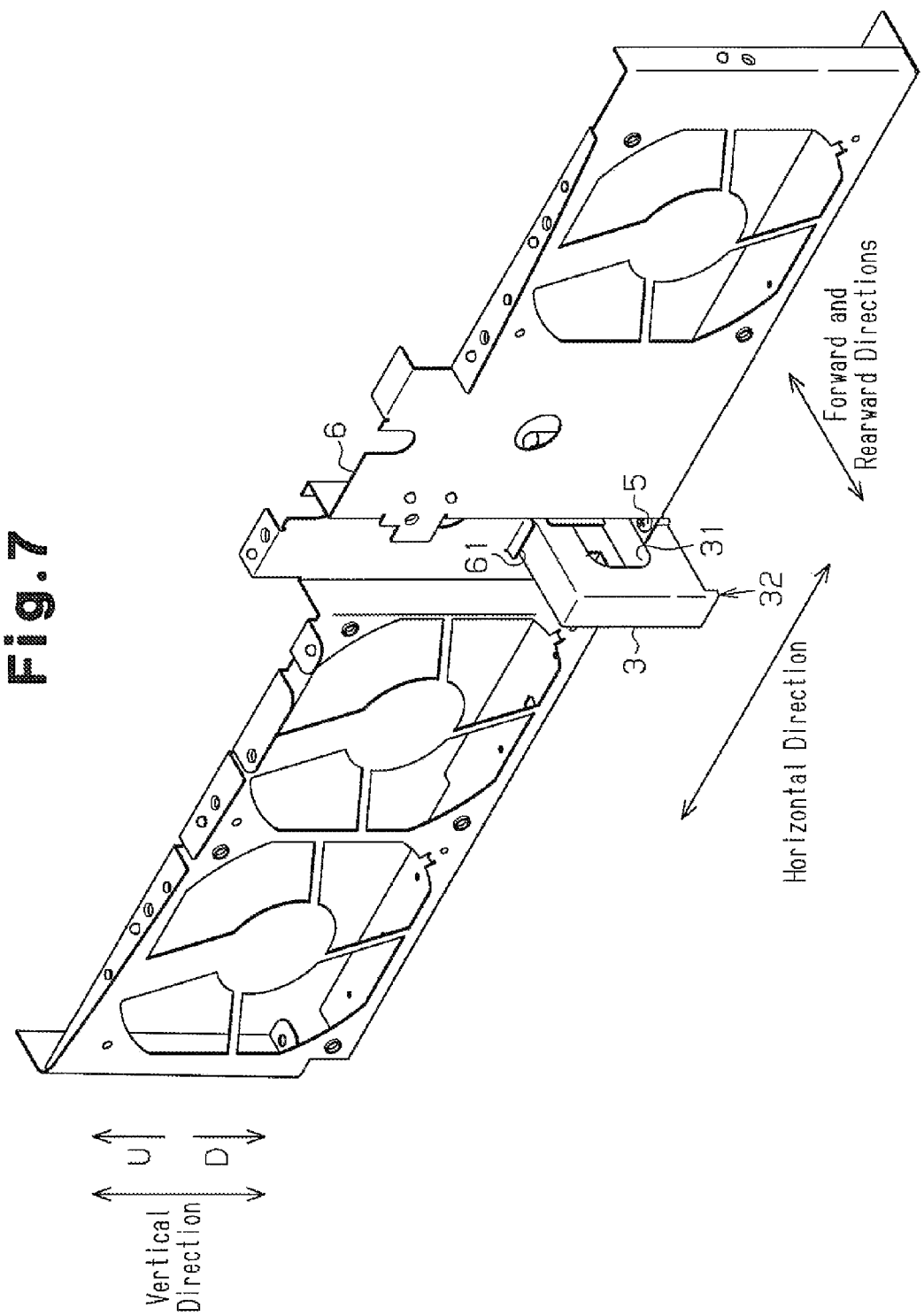

VIDEO PROJECTOR

CROSS-REFERENCE TO RELATED APPLICATIONS

This application is based upon and claims the benefit of priority from prior Japanese Patent Application No. 2008-309753, filed on Dec. 4, 2008, the entire contents of which are incorporated herein by reference.

BACKGROUND OF THE INVENTION

The present invention relates to a video projector that is fastenable to an antitheft cable or cable.

A portable projector includes an antitheft structure, which is fastened to an antitheft cable to prevent theft. One example of such an antitheft structure is a Kensington lock, which is used to secure a projector to an immovable object, such as a table (for example, refer to Japanese Laid-Open Patent Publication No. 2008-20551). The antitheft structure includes a lock shaft arranged on the distal end of an antitheft cable. In a state in which the basal end of the antitheft cable is secured to an immovable object, the lock shaft is inserted into a security slot of the projector. The lock shaft is then locked in this state so that the lock shaft cannot be removed from the security slot of the projector.

Projectors including security bars are proposed (for example, refer to product brochure for LP-XC55 and LP-XC50, Sanyo Electric Co., Ltd., June 2008. The security bar is built into the housing of the projector so as to form a strap passage between the security bar and the housing of the projector. An antitheft wire is inserted through the strap passage and secured to an immovable object, such as a desk, to prevent the projector from being stolen.

SUMMARY OF THE INVENTION

The security slot, strap passage, and security bar are distinct on the exterior surface of the projector even when the antitheft cable is not fastened to the projector. This lowers the aesthetic appearance of the projector.

The present invention provides a video projector including an antitheft structure and having an improved aesthetic appearance.

One aspect of the present invention is a video projector for use with an antitheft cable. The video projector includes a housing, which accommodates a component for projecting and displaying a picture. A cable insertion member is fastenable to an antitheft cable. The cable insertion member is retractable into the housing.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a cross-sectional diagram showing a housing of the video projector shown in FIG. 1 and a cable insertion member in a projected position;

FIG. 3(a) is a perspective view showing the cable insertion member in the projected position;

FIG. 3(b) is a perspective view showing the cable insertion member in a retracted position;

FIG. 4 is an exploded perspective view showing a structure for supporting the cable insertion member of FIG. 3;

FIG. 5 is a cross-sectional diagram showing the housing and the cable insertion member in a retracted position;

FIG. 7 is a perspective view showing a fan bracket including a structure for supporting the cable insertion member.

DETAILED DESCRIPTION OF THE PREFERRED EMBODIMENTS

A video projector according to one embodiment of the present invention will now be discussed. The video projector is, for example, a liquid crystal display (LCD) projector that uses an LCD panel as a light bulb through which light is transmitted to generate a picture.

Figure 1:
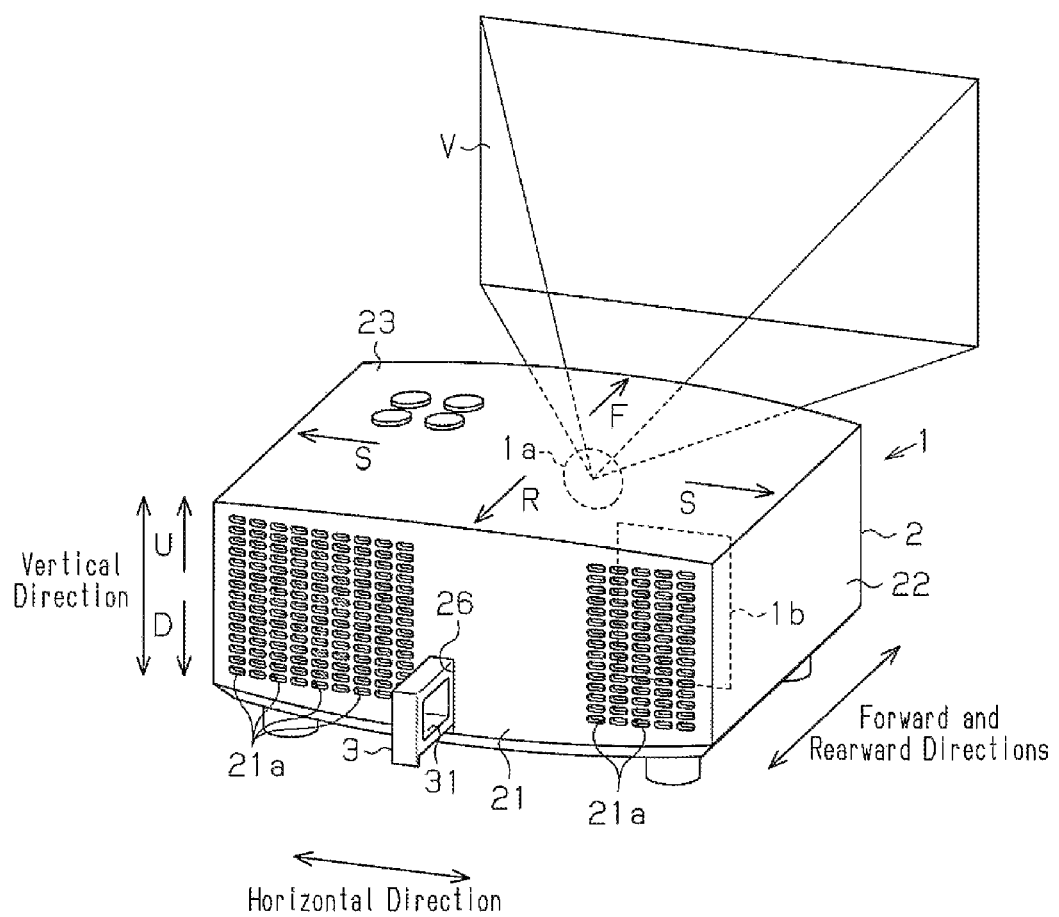
FIG. 1 is a perspective view showing a video projector according to one embodiment of the present invention.

FIG. 1 shows an LCD projector 1 including a housing 2. The housing 2 accommodates various components for projecting and displaying a picture V. The components include, for example, optical components (not shown), such as a light source and an LCD panel, and electronic components (not shown), which control the LCD projector 1. In the drawings, arrows F, R, S, U, and D respectively indicate forward, rearward, sideward, upward, and downward directions of the housing 2. The housing 2 may be formed from resin. The housing 2 may include a rigid frame such as a metallic chassis.

The LCD projector 1 is a front projector. The LCD projector 1 has a front surface in which a projection lens 1a is arranged. The LCD projector 1 emits projection light out of the housing 2 from the front surface of the housing 2 through the projection lens 1a.

Referring to FIGS. 1 and 2, the housing 2 is generally box-shaped and includes a rear surface 21, side surfaces 22, an upper surface 23, and a lower surface 24. The rear surface 21 includes ventilation holes 21a. A ventilation fan 1b is arranged in the housing 2 to force air into or out of the housing 2. The air circulated by the ventilation fan 1b passes through the ventilation holes 21a.

The LCD projector 1 includes a cable insertion member 3, which is movable between a retracted position and a projected position, and a retainer 4, which movably supports the cable insertion member 3 in the housing 2. The cable insertion member 3 is fastenable to an antitheft cable (e.g., cable having a diameter of approximately 14 mm). The retainer 4 functions as a retaining member for the cable insertion member 3.

In the illustrated example, the cable insertion member 3 is arranged in the rear surface 21 of the housing 2. In detail, the lower part in the rear surface 21 of the housing 2 includes a slot 26. The cable insertion member 3 includes a distal end, which is exposed from the exterior surface (rear surface 21) of the housing 2 through the slot 26, and a basal end, which is located in the housing 2. The cable insertion member 3 is linearly slidable toward the front and rear of the housing 2 and may be projected out of the housing 2 through the slot 26. The cable insertion member 3 is also referred to as a retractable cable coupler.

Referring to FIGS. 2 to 5, the cable insertion member 3 may be a tetragonal plate. The cable insertion member 3 includes a loop portion 31, which is for receiving the antitheft cable. In the illustrated example, the loop portion 31 defines an opening extending horizontally through the cable insertion member 3. As shown in FIG. 1, in a state in which the loop portion 31 is exposed from the housing 2 (projected position), the antitheft cable may be horizontally inserted through the loop portion 31.

Figure 6:
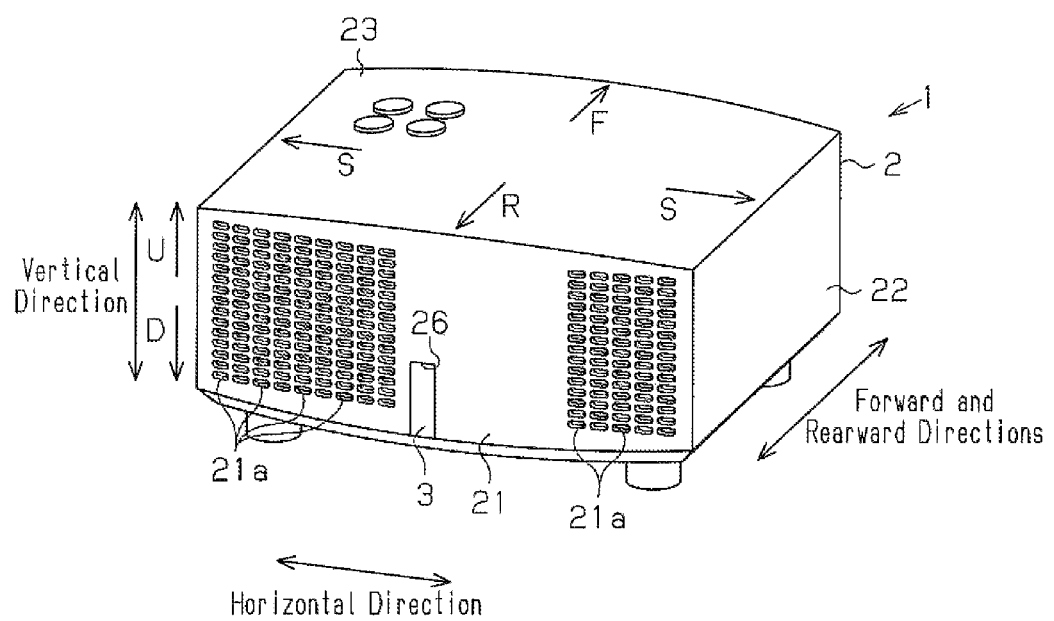
FIG. 6 is a perspective view showing the video projector when the cable insertion member is in a retracted position.

The cable insertion member 3 is movable between the position shown in FIGS. 2 and 3(*a*) in which the cable insertion member 3 is in a projected position and the position shown in FIGS. 5 and 6 in which the cable insertion member 3 is in a retracted position. The cable insertion member 3 is moved from the projected position into the housing 2 (arrow D1) and shifted to the retracted position.

In the retracted position, the cable insertion member 3 is retained in the housing 2. This hides the opening of the loop portion 31 in the housing 2 so that the opening of the loop portion 31 is not exposed from the housing 2. It is preferable that the distal surface of the cable insertion member 3 be flush with the exterior surface of the housing 2 when the cable insertion member 3 is in the retracted position.

Referring to FIGS. 5 and 3(*b*), the cable insertion member 3 is moved outward from the housing 2 (arrow D) to expose the loop portion 31 from the housing 2, as shown in the states of FIGS. 1 and 2. By exposing the loop portion 31 of the cable insertion member 3 from the housing 2 in this manner, the antitheft cable may be inserted into the loop portion 31 of the LCD projector 1 and fastened to the LCD projector 1.

The cable insertion member 3 includes a tab 32 and a flange 33.

The tab 32 extends from the distal side of the cable insertion member 3 (outer side of the housing 2). The tab 32 extends in a direction (for example, downward direction D) perpendicular to the movement direction of the cable insertion member 3. When the cable insertion member 3 is retracted into the housing 2, the tab 32 does not enter the housing 2 and remains exposed from the housing 2.

The flange 33 is arranged at the basal side of the cable insertion member 3 (inside the housing 2). The flange 33 extends from the cable insertion member 3 in directions (e.g., upward direction U and sideward direction S) perpendicular to the forward and rearward directions of the cable insertion member 3. When the loop portion 31 is entirely exposed from the housing 2, the flange 33 comes into contact with the retainer 4 and restricts further outward movement of the cable insertion member 3 from the housing 2.

The loop portion 31, the tab 32, and the flange 33 of the cable insertion member 3 are molded integrally from a resin material. In the preferred embodiment, the resin material forming the cable insertion member 3 includes no closed voids and is solid.

The retainer 4 is a metal plate formed from, for example, steel, stainless steel, or aluminum. The retainer 4 is formed so as to cover the upper surface and two opposing side surfaces of the cable insertion member 3 arranged on a support 27. The retainer 4 holds the cable insertion member 3 in cooperation with the support 27 so as to movably support the cable insertion member 3. The retainer 4 has flat inner surfaces and the support 27 has a flat upper surface to guide reciprocative linear movements of the cable insertion member 3. In the illustrated example, the support 27, which is formed integrally with the inner bottom surface 25 of the housing 2, determines the vertical position (height from the inner bottom surface 25) of the cable insertion member 3.

The retainer 4 is fixed by screws 5 to the housing 2 in a state covering the cable insertion member 3. For example, the screws 5 are mated with nuts 28, which are formed integrally with the inner bottom surface 25 of the housing 2.

The LCD projector 1 of the present embodiment has the advantages described below.

(1) The LCD projector 1 includes a cable insertion member 3, which is fastened to an antitheft cable. The cable insertion member 3 is movable into the housing 2. Thus, when the antitheft cable is not in use (i.e., when the LCD projector 1 is not in a fastened state), the cable insertion member 3 is moved into and hidden in the housing 2. In this state, the opening of the loop portion 31 is not visible from the exterior surface of the LCD projector 1, and the cable insertion member 3 is not distinct. This improves the aesthetic appeal of the LCD projector 1.

(2) The LCD projector 1 includes the projection lens 1*a*, which emits projection light toward the front of the housing 2 to project and display a picture V. The cable insertion member 3 is arranged at the rear of the housing 2. Thus, when viewing the LCD projector 1 from the front, the cable insertion member 3 is not distinct.

(3) The cable insertion member 3 is moved into and retained in the housing 2. In a state in which the cable insertion member 3 is in the retracted position, the distal surface of the cable insertion member 3 is flush with the exterior surface (rear surface 21) of the housing 2, and the cable insertion member 3 is not projected from the housing 2. Thus, when the cable insertion member 3 is in the retracted position, the opening of the loop portion 31 is hidden from the exterior surface of the LCD projector 1, and the cable insertion member 3 is not distinct.

(4) The cable insertion member 3 is movable out of the housing 2 and includes the tab 32, which extends downward in a direction perpendicular to the movement direction of the cable insertion member 3. This allows for the cable insertion member 3 to be easily pulled out of the housing 2 by, for example, holding the tab 32 with one's fingers.

(5) The cable insertion member 3 includes the loop portion 31, into which the antitheft cable is horizontally insertable. This eliminates interference with a setting surface (e.g., upper surface of a table or shelf) of the LCD projector 1, which would occur if the antitheft cable were to be inserted through the loop portion 31 in a vertical direction. This facilitates insertion of the antitheft cable through the loop portion 31.

(6) The cable insertion member 3 is formed from a resin material that is solid and includes no closed voids. Thus, the cable insertion member 3 has high strength in comparison to a resin cable insertion member that includes a closed void.

(7) The LCD projector 1 includes the retainer 4, which retains the cable insertion member 3. The cable insertion member 3 includes the flange 33, which abuts against the retainer 4 when the cable insertion member 3 is in the projected position and thereby restricts further outward movement of the cable insertion member 3 from the housing 2. This prevents the cable insertion member 3, which is supported to be movable outward to the housing 2, from falling out of the LCD projector 1.

It should be apparent to those skilled in the art that the present invention may be embodied in many other specific forms without departing from the spirit or scope of the invention. Particularly, it should be understood that the present invention may be embodied in the following forms.

The shape and material of the cable insertion member 3 may be changed as required. The shapes of the loop portion 31, the tab 32, and the flange 33 may be changed as required. Further, the shape and material of the retainer 4 may be changed as required in accordance with the cable insertion member 3.

In the above-described embodiment, the ventilation fan 1*b* may be a discharge fan that discharges air out of the housing 2. Alternatively, the ventilation fan 1b may be an intake fan that draws air into the housing 2.

Referring to FIG. 7, the ventilation fan 1b is fixed to a fan bracket 6, which may also be used as a retaining member for retaining the cable insertion member 3. The fan bracket 6 is a metal plate formed from, for example, steel, stainless steel, or aluminum. The fan bracket 6 includes a slot 61, which restricts movement of the cable insertion member 3 in upward, downward, and sideward directions while allowing movement of the cable insertion member 3 in forward and rearward directions. In a state in which the cable insertion member 3 is arranged in the slot 61, the fan bracket 6 is fixed to the housing 2 with screws 5. In this manner, the fan bracket 6 supports the cable insertion member 3 to be movable in forward and rearward directions. The function for holding the ventilation fan 1b and the function of the retainer 4 shown in FIG. 4 are both implemented in the fan bracket 6. Thus, in contrast to the example in which the retainer 4 and the fan bracket 6 are discrete members, the structure of FIG. 7 uses fewer components and thereby reduces manufacturing costs.

In the above-described embodiment, the cable insertion member 3 does not have to be arranged in the rear surface 21 of the housing 2. For example, the cable insertion member 3 may be arranged in one of the side surfaces 22 or front surface of the LCD projector 1.

In addition to the LCD projector 1, the present invention may be applied to other types of projectors, such as a projector that uses a digital micromirror device (DMD).

The present examples and embodiments are to be considered as illustrative and not restrictive, and the invention is not to be limited to the details given herein, but may be modified within the scope and equivalence of the appended claims.

What is claimed is:

1. A video projector for use with an antitheft cable, the video projector comprising:
   a housing, with a top, a bottom, a front and a rear wall, and with the top and bottom wall being substantially parallel to each other and the front and rear walls being substantially perpendicular to the top and bottom wall, and the top, bottom, front and rear walls each housing an inner and an outer surface, wherein the housing is configured to accommodates a component for projecting and displaying a picture;
   a cable insertion member which is fastenable to an antitheft cable; and
   a retaining member that is fixed to the inner bottom surface of the housing at a location spaced substantially close to the rear wall of the housing and retains the cable insertion member so that the cable insertion member is retractable into the housing.

2. The video projector according to claim 1, further comprising:
   a projection lens which is arranged at the front of the housing and emits projection light toward the front of the housing;
   wherein the cable insertion member is arranged at the rear of the housing.

3. The video projector according to claim 1, wherein:
   the cable insertion member is movable between a retracted position and a projected position; and
   the cable insertion member has a distal surface and the housing has the outer surface, with the distal surface of the cable insertion member being flush with the outer surface of the housing when the cable insertion member is in the retracted position.

4. The video projector according to claim 1, wherein:
   the cable insertion member is movable along a movement direction and includes a tab extending in a direction perpendicular to the movement direction.

5. The video projector according to claim 1, wherein the cable insertion member includes an opening into which the antitheft cable is insertable in a horizontal direction.

6. The video projector according to claim 1, wherein the cable insertion member is formed from a resin material, and the resin material is a solid resin free from closed voids.

7. The video projector according to claim 1,
   wherein the cable insertion member includes a flange, with the flange abutting against the retaining member when the cable insertion member is moved outward from the housing along a movement direction and thereby restricting further outward movement of the cable insertion member.

8. The video projector according to claim 7, further comprising:
   a ventilation fan; and
   a fan bracket to which the ventilation fan is fixed, wherein the fan bracket is formed integrally with the retaining member.

9. A video projector for use with an antitheft cable, the video projector comprising:
   a housing which accommodates a component for projecting and displaying a picture; and
   a cable insertion member which is fastenable to an antitheft cable, wherein the cable insertion member is retractable into the housing,
   wherein the cable insertion member is linearly slidable along a movement direction between a retracted position and a projected position and includes a tab extending in a direction perpendicular to the movement direction, with the tab becoming flush with an exterior surface of the housing when the cable insertion member is in the retracted position.

10. The video projector according to claim 9, wherein the cable insertion member includes a loop portion defining an opening extending horizontally through the cable insertion member, with a distal surface of the loop portion becoming flush with the exterior surface of the housing and the opening becoming invisible from the exterior surface of the housing when the cable insertion member is in the retracted position.

11. The video projector according to claim 1, further comprising a support that supports the cable insertion member, wherein the retaining member guides the cable insertion member, along with the support so that the cable insertion member slides with reciprocal liner motion between a retracted position and a projected position.

* * * * *